Sept. 29, 1964    R. I. TILLMAN    3,150,631
DEMOUNTABLE STERN DRIVE ASSEMBLY
Filed Aug. 16, 1962    4 Sheets-Sheet 1

INVENTOR.
RUSSELL I. TILLMAN
BY Mattus and Graybeal
ATTORNEYS

Sept. 29, 1964  R. I. TILLMAN  3,150,631
DEMOUNTABLE STERN DRIVE ASSEMBLY
Filed Aug. 16, 1962  4 Sheets-Sheet 2
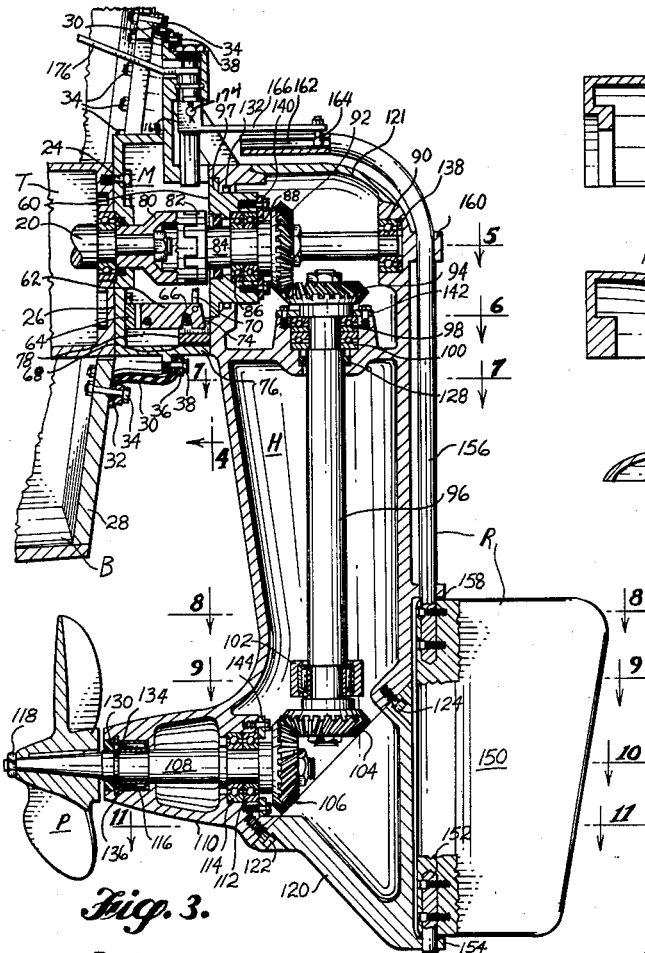
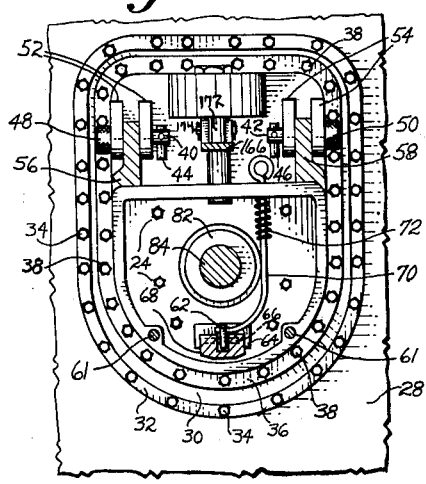
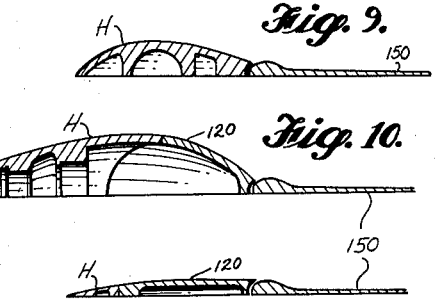
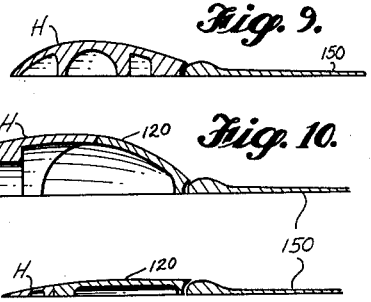
INVENTOR.
RUSSELL I. TILLMAN
BY Mattus and Graybeal
ATTORNEYS INVENTOR.
RUSSELL I. TILLMAN
BY Mathis and Graybeal
ATTORNEYS

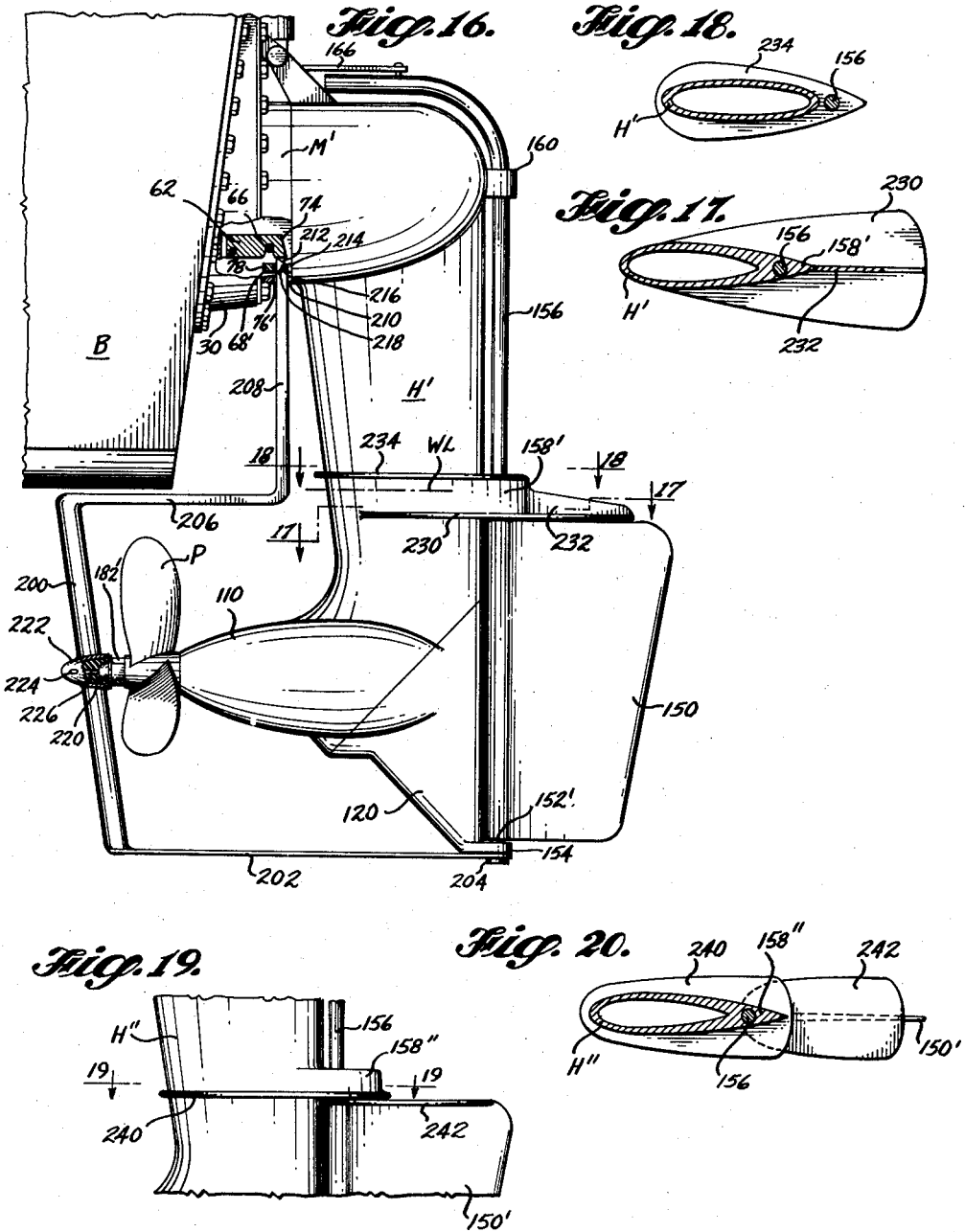

3,150,631
DEMOUNTABLE STERN DRIVE ASSEMBLY
Russell I. Tillman, Auburn, Wash.
(24021 35th S., Kent, Wash.)
Filed Aug. 16, 1962, Ser. No. 218,220
31 Claims. (Cl. 115—34)

This application is a continuation-in-part of my copending application Serial No. 66,332, filed October 31, 1960, now abandoned, and entitled Demountable Stern Drive Assembly.

The present invention relates to power boat drive mechanisms and more particularly relates to demountable stern drive assemblies for power boats of the inboard type, such assemblies being primarily characterized by a drive housing of rigid fixed form throughout and having low drag characteristics, a forwardly directed nacelle and screw propeller at the lower end of the housing, a heavy duty, non-shifted gear train, a non-counterbalanced rudder entirely rearwardly disposed on and faired into the rear edge of said housing, and a unique rudder actuating mechanism. Certain related refinements of the assembly include cavitation plates and splash plates, and cushioned propeller guard units.

Previous stern drive assemblies for power boat application customarily are designed for use with relatively low powered inboard motors, i.e. with motors rated at less than about 100 horsepower, for the simple reason that drag requirements heretofore were considered to limit the lateral dimension of the drive housing of such an assembly to the use of relatively small gearing and shafting, or have belt or chain drive mechanisms which have not proven sufficiently durable and practical for high speed, heavy duty use. Also, it has been heretofore generally considered that a stern drive mechanism should incorporate some form of outboard transmission for forward and reverse shifting of the drive, which type of shift mechanism is necessarily relatively light and of a simple, non-slip, directly meshing character because of space limitations. Moreover, it often becomes quite complicated to mechanically adapt a conventional inboard marine engine to a stern drive assembly which includes its own transmission in that most conventional marine inboard engines are expressly designed to operate as a unit with an inboard transmission.

For heavy duty use, it is considered that a stern drive assembly should desirably utilize not only a conventional inboard marine or marine-conversion engine but also should use a conventional inboard marine transmission.

It is also considered that a forwardly directed or traction screw propeller is much more efficient than a rearwardly directed propeller, particularly for a heavy duty stern drive assembly, in order that the propeller can cut a clean wall of water and in order that the necessarily relatively thick drive housing be placed in the slip stream of the water rearwardly of the propeller rather than interfering with the inflow of water to the propeller. Likewise, it has been determined that contouring the shaft housing in the form of a nacelle or pod behind the forwardly directed propeller, in combination with a rudder element journaled at the rear edge of the shaft housing and nested into the rear housing edge without any counterbalancing surfaces, provides a particularly advantageous arrangement in terms of both propulsion and steering efficiency, and very materially simplifies the overall construction of the stern drive assembly in that there is no need to incorporate means for rotating the housing proper for steering purposes, such as has often been done before in this type of equipment.

Consistent with the above considerations, the principal objects, features and advantages of the stern drive assembly of the present invention include the provision of such assembly wherein the assembly is specifically designed for use with an inboard power unit including a conventional inboard marine transmission, and is readily adaptable to coupling and bracketing for use with any of the various types of existing inboard transmission; wherein a forwardly directed screw propeller is employed, and more specifically wherein the housing configuration and manner of mounting the housing places the screw propellerl under the stern of the boat, thereby eliminating any need for a cavitation plate over the propeller; wherein the housing of the assembly can be pivoted on its mounting bracket about an axis horizontally transverse to the longitudinal axis of the boat in the event of an encounter with an obstruction in the water, or for ready removal of the assembly from the boat, without the housing being otherwise moved operationally, i.e. without rotation of the housing for steering purposes; wherein the assemblage presents no necessity for gear shifting mechanism or linkage through the attaching bracket and the stern drive housing itself; wherein the stern drive assembly involves direct drive shafting and gearing without any outboard clutching or transmission means; wherein a non-shifted drive train consisting of heavy duty shafting and gearing is employed, preferably with the gearing being at least about 4″ in diameter, which size of drive gearing provides a power transfer potential at least about 2.3 times larger than that of earlier drive units involving 3″ drive gearing; wherein the assembly is mountable on its attaching bracket in a manner permitting full kickup and ready removal from the boat simply by manual removal of two pivot pins; wherein the bracketing for mounting the stern drive assembly attaches to the transom of the boat only by a rubber seal and seal ring, the stresses and strains exerted on the boat by the stern drive assembly being transmitted to the inboard engine and engine mounts by virtue of the assembly mounting bracket being bolted directly to the inboard transmission of the boat power unit; wherein the stern drive assembly incorporates a simple yet positive rudder mechanism having progressively increasing leverage as the steering angle of the rudder increases, and having a control arm and tiller arm arrangement whereby conventional outboard motor type steering control linkages inboard of the boat can be used for remote steering control; wherein the stern drive housing in its connection to the mounting bracket includes a shear pin mechanism protecting the housing from breakage in the event of encounter of the drive assembly with an underwater obstruction, such shear pin included safety mechanism further incorporating means automatically safeguarding against re-engagement of the power drive in the event of shearing of the pin; and wherein the forwardly directed screw propeller of the drive assembly can be provided with a cushioned, vertically extending guard spanning the screw propeller and cushioned thereagainst to transfer the force generated by an encountered obstruction directly to the shear pin included safety release mechanism between the housing and its mounting bracket.

The foregoing as well as other characteristic features, objects and advantages of stern drive mechanisms of the present invention will be apparent from the following description of certain typical and therefore non-limitive embodiments thereof, together with the accompanying illustrations of such embodiments, wherein like numerals refer to like parts, and wherein:

FIG. 1 is a view in side elevation, with certain parts broken away and simplified for clarity of illustration, of the stern portion of a power boat equipped with an inboard engine and marine transmission, with the stern drive assembly of the present invention installed thereon, the operating position of the stern drive assembly being shown in full line, and a kickup position thereof being shown in broken line;

FIG. 3 is a view in vertical cross section of the stern drive assembly and mounting bracket therefor, taken on an enlarged scale, with certain parts shown in elevation and with certain parts broken away for clarity of illustration;

FIG. 4 is a detailed view in rear elevation of the mounting bracket area, taken substantially along lines 4—4 of FIG. 3;

FIG. 5 is a horizontal half section of the housing shown in FIG. 3, taken substantially along line 5—5 thereof;

FIG. 6 is a horizontal half section of the housing shown in FIG. 3 taken substantially along line 6—6 thereof;

FIG. 7 is a horizontal half section of the housing shown in FIG. 3 taken substantially along line 7—7 thereof;

FIG. 8 is a view in horizontal half section of the housing and rudder shown in FIG. 3, taken substantially along line 8—8 thereof;

FIG. 9 is a view in horizontal half section of the housing and rudder shown in FIG. 3, taken substantially along line 9—9 thereof;

FIG. 10 is a view in horizontal half section, showing the screw propeller, housing and rudder contouring of the assembly shown in FIG. 3, taken substantially along line 10—10 thereof;

FIG. 11 is a view in horizontal half section of the housing and rudder shown in FIG. 3, taken substantially along line 11—11 thereof;

FIG. 16 is a fragmentary view in side elevation, with certain portions broken away for illustration of interior detail, of a further modified form of the invention, incorporating a cavitation plate above the rudder and a splash plate above the cavitation plate, and also incorporating a modified propeller guard arrangement wherein impact of the guard with an obstruction positively unlatches the latching mechanism between the mounting bracket and housing face;

FIG. 17 is a cross sectional view showing further cavitation plate detail, taken substantially along line 17—17 of FIG. 16;

FIG. 18 is a cross sectional view showing further splash plate detail, taken substantially along line 18—18 of FIG. 16;

FIG. 19 is a fragmentary view in side elevation of a modified cavitation plate arrangement, with a portion of the cavitation suppression means mounted directly on the rudder; and FIG. 20 is a cross sectional view showing further cavitation plate detail, taken substantially along line 20—20 of FIG. 19.

Figure 1:
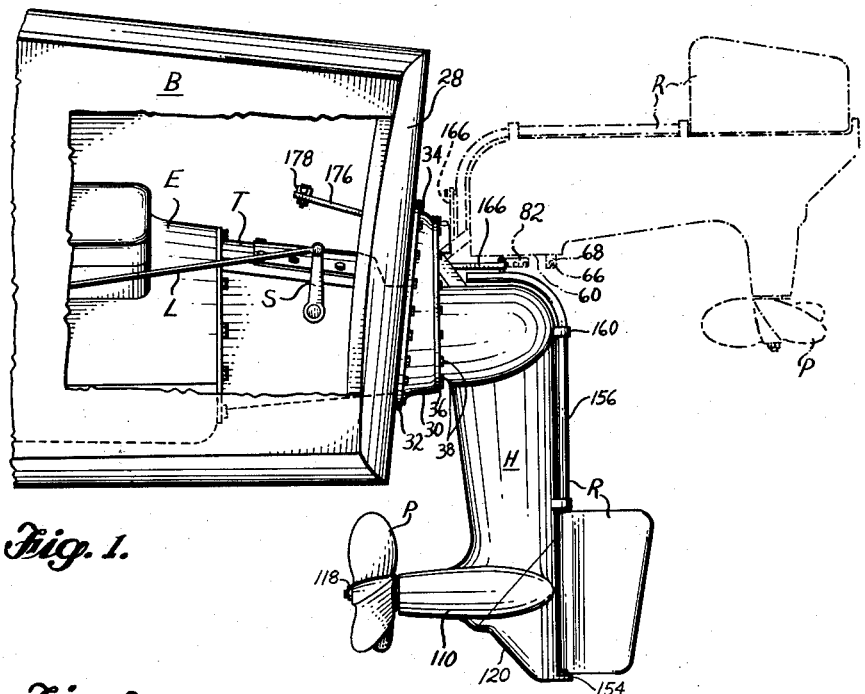
Figure 2:
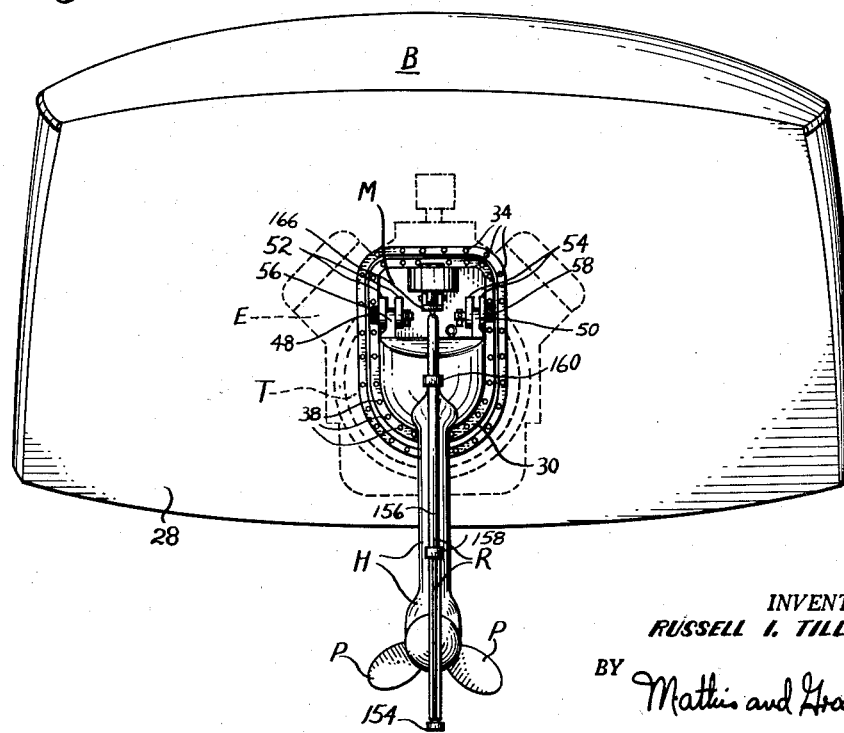
FIG. 2 is a view in rear elevation of the boat and installed stern drive assembly shown in FIG. 1.

Considering more specifically the embodiment of the invention shown in FIGS. 1–12, with first attention being given particularly to FIGS. 1 and 2, it will be understood that power boat B has an inboard power plant including engine E and a marine reversing transmission T, each conventional per se, the block of engine E and the casing of transmission T being a structurally integrated reaction train countering the action drive train including output drive shaft 20 journaled in ball bearing race 22 of transmission T (see FIGS. 1 and 3). To illustrate, a current installation involves a 24′ Higgins boat equipped with a 185 horsepower Chris Craft engine E, operated in conjunction with a Paragon transmission T with remote, manual gear shift effected through movement of shift arm S by linkage L.

In general, the stern drive assemblage of the present invention includes a mounting bracket generally indicated at M, and the demountable stern drive or so-called "outdrive" assembly generally comprises a drive shaft containing housing H, a forwardly directed screw propeller P, and a rudder mechanism R.

Said mounting bracket M is of a suitable configuration in its forward portion to preferably bolt directly on the rear face of transmission T, as by bolts 24, it being readily understood in this respect that various types of conventional transmissions T entail a corresponding variety of configuration detail and bolting arrangement in the layout of the forward face plate 26 of said mounting bracket M, and that it is a significant practical advantage of the present invention that adaptations thereof to any of a variety of particular installations can be accomplished by change in detail only of the mounting bracket M. Alternatively, the shell of mounting bracket M can be cast integrally with the housing of transmission T, to provide an integrated assembly, if desired.

The direct mounting of mounting bracket M on transmission T, as by bolting or otherwise, eliminates any necessity for attachment thereof to the transom 28 of boat B, except as required for watertight integrity, the said transom 28 being suitably cut away such as indicated at 30 in spaced relation to mounting bracket M, the dynamic stresses and strains transmitted to the boat from the stern drive assembly being exerted through mounting bracket M, transmission T and engine E to the engine mounts of the latter, and not to the transom 28. As best shown in FIGS. 3 and 4, the necessary water-tight integrity is provided between transom 28 and mounting bracket M simply by a flexible sealing collar 30, suitably of rubber or plastic, one edge of which is attached to transom 28 by a seal ring 32 bolted to said transom 28 by bolts, certain of which are indicated at 34, and attached at its other edge to mounting bracket M by a second seal ring 36 bolted onto said bracket M by bolts, certain of which are indicated at 38.

As will be noted in FIGS. 1–3, it is an important advantage of the arrangement involving sealing collar 30 and the respective transom mounted seal ring 32 and bracket mounted seal ring 36 that such rings and the associated bolts 34, 38 are readily accessible from the stern of the boat, whether or not the outdrive unit is in place, and positive seal surfaces are provided. As shown in FIGS. 1 and 3 the seal surfaces between which the edges of collar 30 are retained are all essentially flat. And, as best shown in FIG. 2, said rings 32, 36 are geometrically similar and the bolts 34, 38 are fully accessible.

Drive housing H detachably and tiltably mounts on mounting bracket M by means of a pair of coaxially disposed, manually removable lock pins 40 and 42 (see FIG. 4), having end mounted keeper bars 44 and 46 and knurled outer heads 48 and 50, each said lock pins 40 and 42 passing through a respective pair of lugs 52 and 54 standing out rearwardly from mounting bracket M and respective lugs 56 and 58 standing forwardly from the face portion 60 of drive housing H. Said pins 40 and 42 by such arrangement provide a pivot axis for tilting of the stern drive assembly to permit the same to be kicked up, a typical "up" position thereof being indicated by broken lines at FIG. 1. A pair of guide pins 61 (FIG. 4) suitably project from face 60 of housing H and aid pins 40 and 42 in maintaining face 60 and mounting bracket M properly aligned.

Drive housing H is constructed to be of rigid and fixed form throughout its length, i.e. the lower portion of the housing H is not made rotatable about a vertical axis to provide for steering and occasionally for the drive. Rather, the steering is accomplished by use of the rudder R and the reversing is accomplished by reversing the direction of drive of propeller P by means of the inboard reversing transmission T.

When in the operative position shown in solid lines at FIGS. 1-3, the stern drive assembly is locked uprightly, (i.e. substantially vertically) with face portion 60 abutting mounting bracket M, by means of a shear pin included latch mechanism also providing against re-engagement of the propeller drive shafting should the stern drive assembly be kicked up in a manner breaking the shear pin. Specifically, the lockout latching mechanism comprises a notched latch bar 62 pivotally mounted on lug 64, in turn anchored to the rear of face plate 26 of mounting bracket M. The notch of bar 62 engages a shear pin 66 spanning a grooved lug 68 (also see FIG. 1) extending forwardly from face 60 of housing H. When the drive assembly is in operative position, the notch of bar 62 nests over shear pin 66, which relation is readily engaged and disengaged by means of a curved, manually operable release rod 70 (FIG. 4) which on being moved vertically raises the free end of bar 62 above said shear pin 66. Said rod 70 is spring loaded downwardly by compression spring 72 to prevent incidental vibration or the like from accidentally disengaging said bar 62 and the shear pin 66.

Should shear pin 66 be sheared off by encounter of the stern drive assembly with an underwater object, for example, then the spring loading provided by spring 72 and the weight of latch bar 62 causes said bar 62 to pivot downwardly, and the outer end 74 of said latch bar 62 drops to a position where it contacts lower wall 76 of mounting bracket M, whereupon the outer end 78 of grooved lug 68 meets the outer end 74 of bar 62 and prevents return of the stern drive assembly to substantially vertical position until such a time as said latch bar 62 is manually raised by rod 70, such separation also preventing re-engagement of the jaw clutch drive mechanism 80 and 82 between mounting bracket M and the stern drive assembly, discussed in more detail below.

Another important practical feature of the shear pin included lock-out latch mechanism is that the operation of the stern drive assembly is not necessarily disabled should pin 66 be sheared. In the event a kickup and lock-out condition occurs, the drive assembly can be re-engaged simply by stopping rotation of output drive shaft 20 from transmission T, then manually lifting rod 70, whereupon the drive shafting will re-engage and the stern drive assembly is fully as operable as before for forward propulsion.

Output shaft 20 from transmission T is capped with one dog or jaw 80 of a jaw clutch mechanism which separably engages a second dog or jaw 82 thereof, in turn keyed to the end of a horizontally disposed stub shaft 84, with jaw 82 protruding slightly from face 60 of housing H (also see FIG. 1). Said stub shaft 84 is journaled to rotate in ball bearing races 86, 88 and 90 and has keyed thereto a 4" spiral bevel gear 92 meshed with a second 4" spiral bevel gear 94 keyed to the upper end of drive shaft 96 disposed longitudinally in housing H. Bearings 86 and 88 mount in a separable bearing carrier 97, for ready assembly. Said shaft 96 is journaled for rotation in ball bearing races 98 and 100 in its upper portion, and in needle bearing assembly 102 in its lower portion, and terminates at its lower end in a 4" spiral bevel gear 104. Said spiral bevel gear 104 in turn meshes with a 4" spiral bevel gear 106 keyed to the rearward end of propeller shaft 108 led forwardly through hub or nose portion 110 of housing H and journaled for rotation therein by means of axially spaced ball bearings 112 and 114, and needle bearing assembly 116, the forwardly directed propeller P being removably keyed to the forward end 118 of said propeller shaft 108. Characteristic of the invention, the entire propeller shaft assembly is forward of the axial center of vertical drive shaft 96. In this typical embodiment of the invention, with 4" spiral bevel gearing in the drive train, the shafting 84, 96 and 108 is suitably of 1 5/16" minimum dimension.

As shown in FIG. 1 and the cross-sectional view of FIG. 10, the hub portion 110 and the portion of bottom cap 120 immediately rearward thereof are of faired, bulbous configuration, constituting what may be termed a "nacelle" or "pod," within which the propeller shaft 108, bearing assemblies 112, 114, 116, and lower gear cluster 104, 106 are housed. In the cross-sectional views of FIGS. 8–11 it is seen that the concaved trailing edge 121, 121' of housing H is about the same width as the width of the forward part of rudder 150 and that rudder 150 is of curved cross section forwardly, with the leading edge 151 thereof nesting in the concaved trailing edge 121, 121' of the housing H. This faired, nested relation results in substantially no "slotting" occurring between the housing and rudder regardless of the rudder turning attitude with respect to the housing. The nested, faired interrelation of the rudder 150 and the portion of housing H in the propwash further results in significant reduction in drag and increase in turning effectiveness for a rudder of a given area, in comparison with the hydrodynamic characteristics if the rudder were even partially counterbalanced, or even if a non-counterbalanced rudder is used with a substantial gap between the housing and rudder leading edge. This is because any substantial flow of water through a slot or gap between the housing and the rudder tends to cause loss of hydrodynamic "lift" on the low pressure side of the rudder.

Removable bottom cap 120 functionally constitutes part of housing H but is desirably removable therefrom by means of cap screws 122 and 124 for ready interior access to housing H, to facilitate the housing fabrication, and installation and removal of shafts 96 and 108. A top cap 121 similarly forms a part of and provides ready access to the upper interior of housing H.

As will be readily understood, appropriate seals for watertight integrity and other assembly detail of the stern drive assembly can include seals schematically indicated at 126, 128, and 130, O ring 132, snap rings 134, 136 and 138, and bolt down bearing lock rings 140., 142, and 144.

Rudder mechanism R comprises a non-counterbalanced rudder blade 150, the lower forward edge of which removably mounts a stub pivot shaft 152 journaled for pivotal movement in a rearwardly facing lower trunnion lug 154 at the bottom end of bottom cap 120. At its upper leading edge, said rudder blade 150 removably mounts the lower end of a pivotally movable rudder stock or post 156, in turn journaled for rotation in intermediate and upper trunnion lugs 158 and 160 along the rearward edge of housing H. In its upper portion, rudder post 156 is curved to follow the general contour of the upper part of housing H, and terminates in a substantially horizontally disposed free end having an open-ended axially extending groove or slot 162 in turn accommodating a follower means such as ball member 164 at the free end of a pivotally movable control arm 166. The open-ended nature of slot 162 permits ready separation between it and follower 164 when housing H is removed from mounting bracket M.

The forward end of control arm 166 terminates in a pair of integral lugs 168 and 170 (FIG. 4) pivotally mounted on a tiller shaft 172 by a horizontal pivot pin 174, the longitudinal axis of which is coaxial with the axes of mounting pins 40 and 42 so that the tilting axis for the rudder actuating mechanism is the same as that of housing H (also note FIG. 1). Said tiller shaft 172 is journaled for rotation about a vertical axis in the upper portion of mounting bracket M. Bolted onto said shaft 172 is an inboard tiller bar 176, the free end of which mounts a suitable cable clamp 178, or the like (see FIG.

1), the arrangement being such that the rudder actuating mechanism can be conveniently manipulated for steering purposes by connection with remote steering control linkage of the type commonly employed for remote outboard motor steering, for example.

Figure 12:
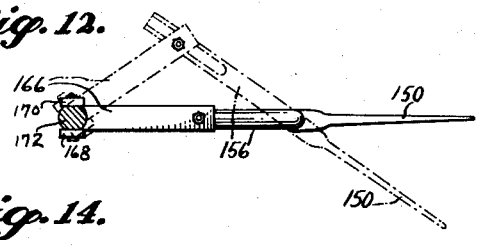
FIG. 12 is a fragmentary plan view of the upper end of the rudder shaft and the associated control arm manipulating same, with a solid line showing of the relation of these elements when the rudder is centered, and with a broken line showing of their relation when the rudder is at a typical steering angle.

As best shown in FIG. 12, one important advantage of the rudder mechanism R characteristic of the present invention resides in the feature wherein the leverage for holding the rudder blade 150 at a desired steering angle is automatically increased proportionately to the extent of steering angle. For example, as shown in FIG. 12, when rudder blade 150 is in a neutral position, follower 164 is at its deepest point in slot 162, and nearest the axis of rotation of rudder post 156, i.e. the rotational axis provided by trunnion lugs 154, 158 and 160. However, when pivotal movement of tiller bar 168 and control arm 166 rotates rudder post 156, the consequent relative movement of follower 164 toward the free end of slot 162 results in an increase in the spacing between said axis of rotation of post 156 and said follower 164, with the result that the leverage available for holding rudder blade 150 at a given rudder angle, or for increasing the rudder angle, is increased, and progressively so with increasing steering angles. As will also be apparent, such increase in leverage results not only from the increasing separation between the rotational axis of post 156 and the position of follower 164, but also because of the relative angle of control arm 166, the increasing leverage such control arm 166 exerts on follower 164 being a function of the absolute value of the tangent of the included angle between slot 162 and control arm 166 in that the axis of rotation of shaft 172 and the axis of rotation of rudder post 156 remain fixed, i.e. at a constant distance from each other.

Such effective increase in the available steering leverage when such leverage is most needed, i.e. when the rudder is farthest "over," adds much to the practicality of a heavy duty stern drive assembly, particularly for high speed use, such as here presented. It is also to be noted with respect to the practicality of rudder mechanism R that the configuration of rudder post 156 conforms substantially to the contour of the upper portion of housing H so that no housing protuberances or sharp edges are involved, for simplicity and safety.

A very basic advantage of the specific drive and steering combination here presented involves the combination of a forwardly directed propeller P placed under or even forwardly of the transom 28 of boat B to minimize cavitation, along with the smooth, low drag configuration of the nacelle in the lower portion of housing H, and along with the specific nested and non-counterbalanced nature of rudder blade 150. For illustration purposes with respect to these configurations, FIGS. 5-11 progressively show housing external contours, and FIGS. 8-11 also show such contouring immediately in front of and along rudder blade 150. FIG. 10 particularly shows the progressive contouring from propeller P through the hub 110 of housing H, and the central contouring of rudder blade 150, all of said views in FIGS. 5-11 being along respective lines 5—5 through 11—11 of FIG. 3.

As is notable particularly with respect to FIGS. 8-11, the surfaces of housing H downstream of propeller P flow quite smoothly and substantially contiguously into the surfaces of rudder blade 150, without any substantial gap or break, and without the counterbalancing commonly employed in some stern drive assemblies. Compositely, the housing and rudder configurations shown collectively in FIGS. 8-11, along with the forwardly directed propeller P provide for quite material improvements in propulsion and steering efficiencies. Considering relative propulsion efficiency, a forwardly directed propeller P is much more efficient than a rearwardly directed propeller in that there is some degree of centrifugal action on the water by the propeller P, and the placement of the drive gear containing nacelle behind the propeller P, rather than ahead of it, tends to have the nacelle occupy space where there is some degree of centrifugal cavitation, with resulting lesser drag. Such lessening of the hub induced drag in effect permits for practical purposes the enlargement of the hub to the point where larger drive shafting and gearing can be efficiently employed. As noted previously, the embodiment of the invention above discussed employs bevel gears 104 and 106 which are 4" in diameter, with the maximum latter dimension of hub 110 being about 4¾", which order of housing lateral dimension would be completely impractical for a drive assembly having a rearwardly directed screw propeller. A stern drive assembly such as illustrated in FIGS. 1-11 and above discussed has proven to be reliably capable of handling a propeller P of 15" diameter at 4,000 r.p.m., for example.

As shown at FIG. 3 for example, the propeller shaft 108 is situated essentially entirely forwardly of vertical drive shaft 96, with the maximum bulge of the nacelle (coincident with gear cluster 104, 106) being relatively close to the rear edge of the housing H. This drive arrangement, with propeller shaft 108 led forwardly from the lower gear cluster 104, 106, and with the bearings 112, 114, 116 therefor also forwardly of the gear cluster, is to be distinguished from the conventional arrangement where the shaft bearings are at both sides of the gear cluster. With the shaft and all bearings forward, the housing area rearwardly of the propeller can be configured to have a straight trailing edge 121, 121', without undue nacelle length. In applicant's housing and drive train arrangement, the nacelle is principally forward of the vertical drive shaft 96 and the rudder 150 and rudder post 156 are situated just behind said shaft 96. By this arrangement, about half of the length of the nacelle is essentially circular in cross section and in faired relation to the propeller hub, and the rudder nests in the relatively narrow, concaved housing edge immediately behind the propeller shaft nacelle.

With respect to steering efficeincy, the smoothly fairing housing and rudder blade configurations shown at FIGS. 8-11 provide an improved functional effect in that the non-counterbalanced rudder blade 150, upon being pivoted to a steering angle, functionally integrates the blade with the housing surface forwardly thereof and actually increases the effective area of rudder blade 150 by virtue of hydrodynamic pressure buildup along one surface of the blade and one surface of the housing. In other words, the available steering area is effectively substantially larger than the physical surface area of rudder blade 150, according to established theory. Confer "Naval Architecture of Planing Hulls" by Lindsay Lord, published by Cornell Maritime Press, Cambridge, Md. (1954, Rev. Ed.) at pages 217–219, for example.

Figure 13:
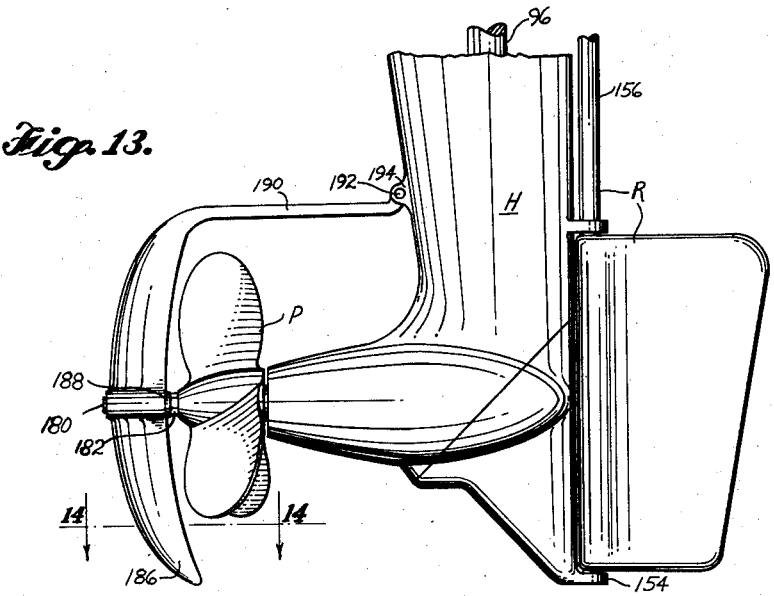
FIG. 13 is a fragmentary view in side elevation of the screw propeller and adjacent shaft housing area, equipped with a cushioned propeller guard.
Figure 14:
FIG. 14 is a detailed view in horizontal cross section of the propeller guard shown in FIG. 13, taken substantially along line 14—14 thereof.
Figure 15:
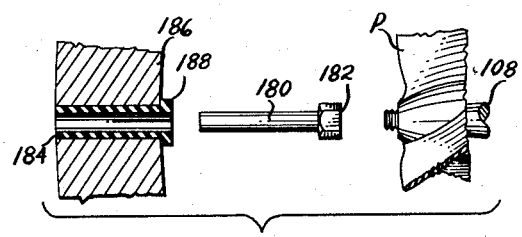
FIG. 15 is an exploded detail view showing the shaft extension and rubber bearing components of the guard construction shown in FIG. 13.

FIGS. 13, 14 and 15 illustrate a modified form of a stern drive assembly according to the present invention. Although non-essential to the operational efficiency of the drive assembly, some installations may find it desirable to provide the forwardly directed propeller with guard means. In contrast to certain prior propeller guards which merely have a return bend bar or the like spanning the propeller and attached at both ends to an assembly housing, the guard assembly shown in FIGS. 13-15 comprises a propeller shaft extension 180 which is preferably integral with propeller mounting nut 182 (see FIG. 15), which extension 180 rotates in a water lubricated rubber sleeve bearing 184 press fit into the midsection of the vertically extending guard bar 186, the said bearing 184 terminating rearwardly in cushioning shoulder portion 188. As shown in the view of FIG. 14, the vertically extending portion of guard bar 186 is preferably of streamline teardrop shape cross sectionally.

Said guard bar 186 curves rearwardly and preferably somewhat upwardly in its upper portion 190 and removably anchors to the leading edge of housing H' by an eye 192 pinned to a lug 194 standing out from said housing H'. Such connection means 192, 194 along with inherent flexure of the portion 190 permits a limited degree of movement of guard bar 186 with respect to shaft extension 180. Upon encounter of guard bar 186 with an underwater obstacle, such limited movement of the guard bar 186 permits transfer of the major force of the encounter from guard bar 186 through rubber bearing 184 and particularly shoulder 188 thereof to the point of propeller P and consequently to the drive housing H' of the assembly so that the likelihood of breakage of guard bar 186, the propeller P, or the housing H is reduced, in that the shock generated by the encounter is transmitted to and distributed throughout the rigid housing. Also, cushioning shoulder 188 of bearing 184 tends to absorb some of the inertial shock of the impact, and augments the protection of the relatively rigid metal components.

As will be apparent, the removable connection of guard bar 186 to housing H' can be placed at any desired point with respect to the drive assembly, such as at a location along the leading edge of housing H' immediately below the portion thereof facing the mounting bracket M, for example.

FIG. 16 presents a fragmented, side elevational view of a modified form of guard arrangement, wherein the vertically extending guard attaches the lower end of the housing, and coacts at its upper end with the latch mechanism in the mounting bracket to unlatch same upon impact of the guard with an obstruction. In FIG. 16, except as otherwise noted, the outdrive assembly is essentially like that illustrated at FIGS. 1–12, including the housing H' with its hub portion 110 and bottom cap 120, rudder 150, rudder post 156, control arm 166, mounting bracket M', flexible collar 30, and the latch assembly comprising latch bar 62, shear pin 66, mounting bracket lower wall 76', and slotted lug 68'.

In FIG. 16, the guard comprises an upright strut 200, preferably slightly forwardly canted, as shown. In cross section, strut 200 is geometrically similar to the cross section of housing H' in its central area (cf. FIG. 7), for low hydrodynamic drag. The lower end of said strut 200 is joined to a lower strap 202 which is preferably thin in its vertical dimension so as to not influence the turning characteristics of the unit, and of substantially the same width as lower trunnion lug 154 (cf. FIG. 2). The rearward end of strap 202 is suitably retained at the lower extremity of housing H', as by an enlarged head 204 on rudder stub shaft 152'. If desired, the connection of the rear end of the strap 202 to the housing H' can include a cushioning element, such as a rubber grommet (not shown) nested between the hole in the strap 202 and the stub shaft 152'.

The upper end of guard strut 200 joins a generally horizontally extending bar 206 which in turn joins a vertical bar 208 passing at its upper end through a slot 210 in the lower wall 76' of mounting bracket M'. Said bar 208 at its upper extremity is preferably configured to have a beveled surface 212, and is movably pinned to lug 68'. As shown in FIG. 16, said lug 68' comprises an enlarged slot 214 through which the end of rod 208 passes, and a pin 216 in the lug 68' rides in an angled slot 218 in the end of rod 208.

Guard strut 200, in a manner similar to the form of the guard illustrated at FIGS. 13–15, centrally rests in cushioned engagement with an "acorn" type propeller mounting nut 182', providing a domed bearing surface engaged by a water lubricated rubber or like cushioning element 220 housed in ogival cap 222. Suitable water access for lubrication is provided, as by port 224 in the cap 222 and passageway 226 in the cushioning element 220.

By virtue of the cushioning element 220 and the somewhat resilient nature of the guard assembly 200, 202, 206, 208 in general, when the strut 200 impacts an obstruction, a degree of vertical and/or horizontal movement in the vertically extending rod 208 is generated, whereupon the camming action provided by slot 218 riding on pin 216 results in a lifting of the end of the latch bar 62 and a disengagement of the latch bar 62 and the shear pin 66. Thus, upon obstruction impact, propeller guard movement frees the stern drive unit without breakage of shear pin 66, at least in most instances, so that the unit can tilt back and move clear of the obstruction, after which re-engagement of the jaw clutch mechanism 80, 82 (FIG. 3) is prevented by the outer end 74 of latch bar 62 engaging the outer end 78 of lug 68'. Re-engagement of the drive can then be accomplished at will by the manual lifting of latch bar 62 through the medium of rod 70 (FIG. 3), to re-engage the notch of bar 62 with pin 66.

FIG. 16 and the cross sectional views of FIGS. 17 and 18 serve to also illustrate a typical manner of utilization of cavitation suppression means and splash suppression means in conjunction with an outdrive unit according to the invention. In the form shown in FIGS. 16 and 17 the means for suppressing rudder induced cavitation is the cavitation plate 230 cast integrally with the housing H' and configured to stand rearwardly of the housing contiguous to the top of the rudder 150. As shown, plate 230 flares out from the sides of the housing H' progressively from a point well forward of the rudder 150 to a point near the trailing edge of the rudder. A vertically disposed strengthening rib 232 is also integrally formed with the plate 230 and housing H', and stands rearwardly from the trunnion lug 158'.

Cavitation plate 230 serves to minimize the rudder induced cavitation when the rudder is of a length to have the upper edge thereof running near the water surface. The cavitation plate 230 minimizes cavitation of surface water behind the rudder, so that hydrodynamic lift is maintained even at relatively sharp rudder angles. Viewed in a somewhat different light, cavitation plate 230 permits the rudder to be designed so that its upper edge is substantially at the opering waterline, rather than submerged a considerable distance. This in turn results in a larger and more effective rudder without increasing rudder depth or rudder width.

As noted in FIG. 16, the plate 230 is contiguous to the upper edge of the rudder 150, with only a very small spacing therebetween. This spacing should in any case be not more than about ½", and is preferably as small as practicable, so long as the upper rudder edge does not rub on the plate.

A splash suppresion means in the form of a splash plate 234 is optionally but not necessarily used in conjunction with the cavitation plate 230 to suppress vertically rising water, or so-called "roostertailing" effects. These effects do not impair operating efficiency, but are considered unattractive by some users. Said splash plate 234 can suitably be formed as by being cast as an integral part of housing H', and stands out generally horizontally entirely around the housing H' above the cavitation plate 230. The purpose of splash plate 234 is simply to laterally deflect any vertically rising water coming off the housing H' at its intersection with the operating waterline (indicated in a typical instance at WL in FIG. 16).

FIGS. 19 and 20 illustrate a modified form of means for suppressing rudder-induced cavitation. In this variation, a part of the cavitation suppression means is in the form of an integrally cast plate 240 extending around the housing H" and the upper trunnion lug 158" just above the upper edge of rudder 150'. In conjunction with the housing mounted plate 240, a second cavitation plate 242 is formed integral with and stands out from the rudder 150' at the upper end thereof, so as to lie contiguously under the plate 240 and be movable with the rudder, being in operational effect a steerable continuation of the plate 240. As will be apparent, with the plates 240, 242 riding at or just below the water surface, any tendency for rudder induced cavitation to occur when the rudder is thrown over is blocked by the combined action of the plates 240, 242.

From the foregoing various further features, advantages, objectives, modifications, adaptations and rearrangements of the assemblage and components thereof will be apparaent to those skilled in the art within the scope of the following claims.

What is claimed is:

1. An outdrive unit comprising a rigid gear train housing with a forwardly directed nacelle at the lower end of said housing and integral therewith, a gear train including a vertical drive shaft journaled in said housing and a horizontal propeller shaft journaled in said nacelle entirely forwardly of said vertical drive shaft, a forwardly directed propeller arranged forwardly of said nacelle at the forward end of said propeller shaft, and a non-counterbalanced rudder journaled at the rear edge of said housing rearwardly of said propeller and nacelle, the housing rear edge being essentially vertical throughout and of laterally concave form forwardly of the rudder, and the forward edge of said rudder being of laterally rounded form and nested into said essentially vertical housing rear edge.

2. A power boat outdrive assembly comprising a rigid gear train housing with a forwardly directed nacelle at the lower end of said housing and integral therewith, a gear train including a vertical drive shaft journaled in said housing and a horizontal propeller shaft journaled in said nacelle entirely forwardly of said vertical drive shaft, a forwardly directed propeller arranged forwardly of said nacelle at the forward end of said propeller shaft, and a non-counterbalanced rudder blade having a straight, vertically extending leading edge nested into the rear of said housing closely behind said vertical drive shaft and in the area of the housing rearwardly of said propeller and said nacelle, the propwash portion of the housing and the rudder blade being configured to provide low drag surfaces, the rearward edge of said housing fairing contiguously of the forward portion of said rudder blade so that the effective steering surface of said blade when at a steering angle includes both the physical area thereof and a portion of the contiguous housing surface area.

3. An outdrive unit for a power boat, comprising a rigid gear train housing with the forwardly directed nacelle at the lower end thereof, a forwardly directed propeller forward of said nacelle, a non-counterbalanced rudder having a straight, vertically extending leading edge closely nested behind the rear edge of said housing rearwardly of said propeller and nacelle, and drive train gearing including a vertical drive shaft carrying a beveled gear at its lower end, a propeller shaft within said nacelle carrying a bevel gear at the rearward end thereof in mesh with the said drive shaft bevel gear, and axially spaced bearings for said propeller shaft, the said propeller shaft and its bevel gear and bearings being situated entirely forwardly of the center of said vertical drive shaft, and the said bearings being situated entirely forwardly of the bevel gear at the rearward end of the propeller shaft, with the nacelle being principally forward of the vertical drive shaft.

4. An outdrive unit according to claim 3, wherein the rear edge of said housing is substantially straight and of concaved configuration cross sectionally, such housing rear edge being immediately behind the rear of said nacelle, with the forward edge of said rudder being nested in the concaved housing rear edge.

5. An outdrive unit according to claim 3, wherein said bevel gears are at least about 4 inches in diameter.

6. An outdrive unit according to claim 3, wherein said nacelle is essentially circular in lateral cross section throughout about the forward half thereof.

7. A power boat outdrive assembly having a substantially vertically disposed, single strut drive train housing carrying a forwardly directed screw propeller at its lower end, a rudder post journaled along the rear edge of said housing, and a rudder blade having a leading edge closely nested behind the rear edge of said housing, said rudder blade being attached to said rudder post and journaled for pivotal movement rearwardly of said housing, the said housing enclosing drive train gearing and shafting including a vertically disposed drive shaft directly linked by a bevel gear cluster to a lower, horizontally disposed drive shaft in turn mounting said screw propeller, said bevel gear cluster comprising a first bevel gear at the lower end of said vertically disposed drive shaft and a second bevel gear at the rearward end of said lower, horizontally disposed drive shaft, means journaling said lower horizontally disposed drive shaft for rotation within said housing including axially spaced sets of bearings located forwardly of said bevel gear cluster, the drive train housing area surrounding such bevel gear cluster and the configuration of such rudder blade downstream thereof providing smoothly faired, substantially contiguous surfaces therebetween so that the slip stream from said forwardly directed propeller encounters minimal housing drag and the housing surfaces complement the rudder blade surfaces insofar as concerns effective rudder surface area.

8. A power boat drive assembly having a tiltable, substantially vertically extending propeller drive train housing, a non-counterbalanced rudder mechanism faired into said housing and comprising a rudder blade journaled along its forward edge for movement about an axis extending contiguously of the rear edge of the drive train housing, said assembly further comprising, a rudder post configured to parallel the general contour of said housing and terminating in a substantially horizontally disposed upper end, and a control arm mounted for pivotal movement about a substantially vertical axis and forwardly of said rudder post, the free end of said rudder post and the free end of said control arm being separably connected by slidable interconnection means, the relative movement between said slidable interconnection means upon pivotal movement of such control arm and said rudder causing the leverage from a given moment of force applied to said control arm to exert an order of force on said rudder blade progressively increasing in direct relation to the increasing steering angle of said blade, such rudder blade actuating mechanism further comprising a pivot shaft movable about a substantially vertical axis by means of a tiller arm arranged through and inboard of the mounting bracket for said stern drive assembly, the said control arm being relatively pivotable vertically with respect to said pivot shaft and being coupled thereto for movement horizontally.

9. In combination with a power boat equipped with an inboard engine and an inboard reversing transmission, an outdrive assembly comprising an outboard, substantially vertically extending drive train housing of fixed form throughout and carrying a forwardly directed screw propeller at the lower end thereof, the said drive train housing having an upper face portion demountably attachable to a mounting bracket extending through the transom of said boat with the said mounting bracket being rigidly connected only to said inboard transmission, and a rudder mechanism including a rudder and rudder post journaled rearwardly of said housing, said rudder post being substantially vertically disposed in its lower portion and substantially horizontally disposed in its upper portion, said upper portion having provided therein a slot means in turn accommodating a follower means situated at the free end of a control arm journaled for pivotal movement in the upper portion of said mounting bracket.

10. A combination according to claim 9, comprising a pair of laterally disposed, removable pin means mounting said housing to said bracket, and releasable latch means for locking said housing in operative position on said bracket.

11. A combination according to claim 9, wherein said housing mounts on said bracket by a pair of laterally disposed, removable pin means and locks in operative position on said bracket by means of a latch assembly, said latch assembly comprising a pivotally mounted, notched latch plate on said bracket and a shear pin on the face portion of said housing nesting with said bracket, the notch of said latch plate engaging said shear pin when said housing is disposed in operative drive position.

12. A combination according to claim 11, wherein said latch plate operates in conjunction with a lug means standing forwardly from said housing face portion to prevent reconnection of the separable drive means between the bracket mounted drive shaft and the upper stub shaft in said housing in the event said shear pin is broken and such drive means are operationally disengaged.

13. A combination according to claim 11, further comprising spring loaded manual lift means for disengaging said latch means and said shear pin.

14. An outdrive assembly for a power boat, comprising a rigid drive train housing having a propeller shaft with a shaft mounted screw propeller extending forwardly from the lower end thereof, said shaft having a nose portion extending forwardly of the propeller, such outdrive assembly further comprising propeller guard means vertically spanning and disposed at least in part forwardly of said forwardly directed screw propeller, and resilient means disposed between said guard means and said propeller shaft nose portion, the said guard means being thereby arranged in cushioned, impact force transfer relation with the nose portion of said forwardly directly shaft.

15. An outdrive assembly according to claim 14, wherein said guard means comprises a propeller nose cap, and a resilient element housed in said nose cap, such resilient element being in substantial engagement with a domed nut at the forward tip of said propeller shaft.

16. An outdrive assembly according to claim 15, comprising porting means in said nose cap and resilient element for admitting water to lubricate movement between said domed nut and said resilient element.

17. A demountable outdrive assembly for a power boat, comprising a rigid drive train housing having a shaft mounted screw propeller extending forwardly from the lower end thereof, with a propeller guard vertically spanning said propeller, the said propeller shaft mounting a forwardly directed shaft extension ahead of said screw propeller, said shaft extension being journaled in a cushioning element in said propeller guard.

18. An assembly according to claim 17, wherein the guard portion in which said shaft extension rotates includes bearing means having a rubber cushioning shoulder between said guard and said propeller so that sharp impact force encountered by said guard is transmitted directly through the nose of said propeller to said main housing.

19. An assembly according to claim 17, wherein said propeller guard is removably attached at its upper end to the leading edge of said housing.

20. An outdrive assembly for a power boat equipped with an inboard engine and an inboard reversing transmission, said drive assembly comprising a mounting bracket structurally integrated with said inboard transmission, and an outdrive unit pivotally mounted on said bracket, with latch means between said bracket and said outdrive unit constructed to unlatch and release the bottom portion of said outdrive unit from said bracket when moved upwardly, the said outdrive unit comprising a drive train housing with a shaft mounted screw propeller extending forwardly from the lower end thereof, and with propeller guard means vertically spanning said propeller forwardly thereof, the said guard means extending upwardly to a point of substantial engagement with said latch means and in a position to push said latch means to an unlatched position upon impact of said guard means with an obstruction.

21. An assembly according to claim 20, wherein said propeller guard means is affixed to said housing at the lower end thereof, and extends around hte propeller in a manner so that the portion of the guard forward of the upper part of the propeller is slightly forward of the guard portion forward of the lower part of the propeller, the upper end of said guard extending generally vertically into said mounting bracket and terminating in a latch lifting surface whereby impact with the guard in the area thereof forward of the propeller results in unlatching of the latch mechanism.

22. An assembly according to claim 21, wherein the said upper end of the guard is in the form of a vertically extending rod passing through an enlarged slot in a lug extending forwardly of the face of the housing, the said rod having an angled slot through which passes a pin affixed to said lug, such angled slot and pin providing a camming action and a lifting of said vertical bar upon either horizontal or vertical movement of said bar.

23. An outdrive unit comprising a rigid gear train housing with a forwardly directed nacelle at the lower end thereof, a forwardly directed propeller forward of said nacelle, a non-counterbalanced rudder journaled to said housing rearwardly of said propeller and nacelle with the leading edge of said rudder closely nested behind the rear edge of said housing and cavitation suppression means extending laterally and rearwardly of said housing contiguous to and in superposed relation to substantially the entire rudder surface area.

24. Mechanism according to claim 23, comprising a cavitation suppression means in the form of a plate integral with said housing and contiguous to the top edge of the rudder.

25. Mechanism according to claim 23, wherein said cavitation suppression means comprises a plate integral with and standing out from said rudder at about the top edge thereof.

26. Mechanism according to claim 23, wherein said cavitation suppression means in part comprises a surface integral with the housing and standing out therefrom slightly above the rudder, and further comprises surfaces standing out laterally at each side of said rudder at about the top edge thereof, with such latter-mentioned surfaces being partially overlapped by such first-mentioned surface.

27. In combination with a power boat equipped with an inboard engine and an inboard reversing transmission, an outdrive assembly comprising an outboard, substantially vertically extending drive train housing of fixed form throughout and carrying a forwardly directed screw propeller at the lower end thereof, the said drive train housing having an upper face portion demountably detachable to a mounting bracket extending through the transom of said boat with the said mounting bracket being rigidly connected only to said inboard transmission, and a rudder mechanism including a rudder and rudder post journaled rearwardly of said housing, said rudder post being substantially vertically disposed in its lower portion and substantially horizontally disposed in its upper portion, said upper portion having provided therein a slot means in turn accommodating a follower means situated at the free end of a control arm, with the other end of said control arm being connected to a tiller shaft journaled for pivotal movement on the upper portion of said mounting bracket, and with said rudder mechanism also including steering control means directly connected to said tiller shaft for rotating same.

28. The combination of claim 27, wherein the steering control means directly connected to said tiller shaft comprises a tiller bar extending from said tiller shaft inboardly through a space between said mounting bracket and said transom.

29. In combination with a power boat equipped with an inboard engine and an inboard reversing transmission having output drive shaft extending rearwardly therefrom and journaled for rotation by bearing means situated in a rearward portion of said transmission, an outdrive assembly comprising a mounting bracket affixed to said inboard transmission and including a forward wall portion with an opening therein in surrounding relation to the transmission drive shaft, a gear train housing having an upper face portion demountably attachable to said mounting bracket, a nacelle at the lower end of said housing, a propeller at one end of said nacelle, gear train means in said housing drivingly connected between said transmission drive shaft means and the propeller, a rudder journaled at the rear edge of said housing rearwardly of said propeller and nacelle, and rudder control means carried by said mounting bracket, the said rudder control means including a pivotally movable tiller shaft extending through and journaled in said mounting bracket with one portion of said shaft being on the outboard side of said bracket and operatively linked to said rudder post and with another portion of said shaft being on the inboard side of said bracket, whereby the said rudder control means is led forwardly through the bracket and said bracket provides watertight integrity therefor.

30. The combination of claim 29, wherein said transmission output drive shaft, said mounting bracket, and a control arm connected to said tiller shaft all extend through the same hole in the transom without structural interconnection therewith.

31. An outdrive unit for a power boat, comprising a gear train housing having a forwardly directed nacelle at the lower end thereof, a forwardly directed propeller forwardly of said nacelle, and drive train gearing in said housing including a vertical drive shaft carrying a bevel gear at its lower end and a propeller shaft within said nacelle carrying a bevel gear at its rearward end meshing with the said drive shaft bevel gear, and axially disposed bearings for said propeller shaft arranged forwardly of the end placed bevel gear thereon, the said propeller shaft, its bearings and its bevel gear all being situated entirely forwardly of the center of the vertical drive shaft, said nacelle including an axially extending internal passageway through which the propeller shaft and its bearings extend, said passageway being smaller in dimension than the bevel gear carried at the rearward end of the propeller shaft, and said gear train housing also comprising a removable end cap disposed generally below and to the rear of said bevel gears and covering an access opening in the gear train housing through which the vertical drive shaft and its bevel gear and the propeller shaft and its bevel gear are installed.

References Cited in the file of this patent

UNITED STATES PATENTS

| | | |
|---|---|---|
| 471,202 | Victor | Mar. 22, 1892 |
| 1,990,387 | Linthwaite | Feb. 5, 1935 |
| 2,345,689 | Snadecki | Apr. 4, 1944 |
| 2,545,502 | Troester | Mar. 20, 1951 |
| 2,979,019 | Leavitt | Apr. 11, 1961 |
| 3,051,119 | Hamlyn | Aug. 28, 1962 |
| 3,057,320 | Daniels | Oct. 9, 1962 |
| 3,088,430 | Champney | May 7, 1963 |

FOREIGN PATENTS

| | | |
|---|---|---|
| 22,691 | Netherlands | Oct. 15, 1930 |
| 448,067 | Canada | Apr. 27, 1948 |
| 561,879 | Canada | Aug. 12, 1958 |
| 890,890 | France | Nov. 19, 1944 |